(12) United States Patent
Geltinger et al.

(10) Patent No.: US 9,039,404 B2
(45) Date of Patent: May 26, 2015

(54) APPARATUS AND METHOD OF SHAPING PLASTICS MATERIAL PRE-FORMS INTO PLASTICS MATERIAL CONTAINERS WITH AIR EXTRACTION GUIDED THROUGH A SURGE CHAMBER

(75) Inventors: Florian Geltinger, Donaustauf (DE); Franz Braun, Regensburg (DE); Yasin Kerim, Koenigsbrunn (DE)

(73) Assignee: KRONES AG (DE)

( * ) Notice: Subject to any disclaimer, the term of this patent is extended or adjusted under 35 U.S.C. 154(b) by 366 days.

(21) Appl. No.: 13/528,587

(22) Filed: Jun. 20, 2012

(65) Prior Publication Data
US 2012/0326360 A1    Dec. 27, 2012

(30) Foreign Application Priority Data

Jun. 24, 2011   (DE) .......................... 10 2011 105 745

(51) Int. Cl.
| | |
|---|---|
| *B29C 49/46* | (2006.01) |
| *B29C 49/42* | (2006.01) |
| *B29C 49/12* | (2006.01) |
| *B29C 49/36* | (2006.01) |
| *B29C 49/06* | (2006.01) |

(52) U.S. Cl.
CPC ................. *B29C 49/46* (2013.01); *B29C 49/12* (2013.01); *B29C 49/36* (2013.01); *B29C 49/42* (2013.01); *B29C 2049/4697* (2013.01); *B29C 49/06* (2013.01)

(58) Field of Classification Search
CPC .......................... B29C 49/46; B29C 2049/4697
See application file for complete search history.

(56) References Cited

U.S. PATENT DOCUMENTS

| | | | |
|---|---|---|---|
| 2010/0266467 A1* | 10/2010 | Laumer et al. | 422/291 |
| 2011/0133369 A1* | 6/2011 | Martini et al. | 264/523 |

FOREIGN PATENT DOCUMENTS

| | | | |
|---|---|---|---|
| EP | 1601606 | 12/2005 | ................ B67C 3/22 |
| EP | 1821010 | 8/2007 | ................ F16J 15/40 |
| GB | 407672 | 3/1934 | ................ B67C 7/00 |
| WO | WO2009/047171 | 4/2009 | ................ A61L 2/20 |
| WO | WO2010/020529 | 2/2010 | ............. B29C 49/36 |

OTHER PUBLICATIONS

German Search Report issued in DE 102011105745.9 dated Mar. 28, 2012 (5 pgs).

* cited by examiner

*Primary Examiner* — Robert B Davis
(74) *Attorney, Agent, or Firm* — Hayes Soloway P.C.

(57) ABSTRACT

An apparatus and method for the shaping of plastics material pre-forms into plastics material containers with at least one blow moulding station which is arranged on a conveying device rotatable about a pre-set axis of rotation (D). The blow moulding station has a blow mould and this blow mould forms a cavity in the interior of which the plastics material pre-forms are capable of being expanded by being acted upon with a gaseous medium to form the plastics material containers, with a stressing device, which acts upon the plastics material pre-forms with the gaseous medium in order to expand them, and with a clean room, which surrounds the blow moulding station at least in part. The clean room is bounded off from an environment by at least two walls which are movable relative to one another.

18 Claims, 6 Drawing Sheets

Prior Art

APPARATUS AND METHOD OF SHAPING PLASTICS MATERIAL PRE-FORMS INTO PLASTICS MATERIAL CONTAINERS WITH AIR EXTRACTION GUIDED THROUGH A SURGE CHAMBER

BACKGROUND OF THE INVENTION

The present invention relates to an apparatus and a method of shaping plastics material pre-forms into plastics material containers. Apparatus and methods of this type have long been known from the prior art. An apparatus of this type for the shaping of plastics material pre-forms into plastics material containers, also referred to below as a stretch blow moulding machine, usually has a plurality of blow moulding stations in which the pre-forms are blow moulded into plastic bottles by the application of an internal pressure. These finished blow moulded plastics material containers are soiled after this process and have to be cleaned in a complicated manner afterwards in order to observe specified hygiene standards.

In addition, blow moulding machines of this type, in which the shaping process takes place inside a clean room are known from the prior art. This means that the plastics material pre-forms are shaped into the plastics material containers inside this sterile room or clean room.

A sterile blow moulding machine is known from WO 2010/020529 A2. The subject matter of this publication is hereby also made the subject of the present application by reference in its entirety.

In this case an important component of apparatus of this type is a sealing device by which the clean room is bounded off from the environment. So-called surge chambers, which have a continuous duct for liquid which is arranged in a stationary manner for example and with respect to which a wall of the clean room is moved, are known in this case from the prior art, the aforesaid wall dipping into this duct for liquid and a seal thus being achieved by the liquid present in the duct.

A further problem in the case of machines of this type, however, is that an exchange of gas is to take place in part between areas of the clean room or between sealed areas of the machine respectively and the environment, and this exchange of gas should be controlled as much as possible and should also take place under aseptic conditions. The surge chamber described above allows a rotation to be possible on the one hand and prevents the gas from being able to escape at the liquid barrier on the other hand. In this way, the surge chamber forms a rotatable sealed-tight connection or a liquid bath forming an hydraulic seal respectively.

The object of the present invention is to provide an apparatus which despite the seal formed by the surge chamber also allows an operationally reliable extraction of media or even an operationally reliable supply of media, and in particular gaseous media.

SUMMARY OF THE INVENTION

An apparatus according to the invention for the shaping of plastics material pre-forms into plastics material containers has at least one blow moulding station which is arranged on a conveying device rotatable about a pre-set axis of rotation, the blow moulding station having a blow mould and this blow mould forming a cavity in the interior of which the plastics material pre-forms are capable of being expanded by being acted upon with a gaseous medium to form the plastics material containers. In addition, the apparatus has a stressing device, which acts upon the plastics material pre-forms with the gaseous medium in order to expand them, as well as a clean room, which surrounds the blow moulding station at least in part, this clean room being bounded off from an environment by means of at least two walls which are movable relative to one another, and the apparatus having a sealing device which bounds off from the environment the clean room in a region of the walls movable relative to one another, the sealing device having a first continuous duct, which is capable of being filled with a liquid, as well as opposite this duct a first continuous wall member which is capable of being guided at least locally inside the liquid medium.

In this case this duct capable of being filled can be connected in a fixed or at least in a sealed manner to the first wall and in a corresponding manner the continuous wall member can be connected in a fixed or a sealed manner to the second wall. In this way, the continuous wall member is advantageously made annular and in a particularly preferred manner the duct is also made annular.

According to the invention a line for a flowable medium extends in a portion of the duct, this flowable medium being capable of being conveyed through this portion of the duct and being permanently separated from the medium present in the duct. The line can be a line element such as a pipe line, but a line is understood as being any device which is suitable for passing on the flowable medium. In this way, the line can also be formed by walls of the duct or also in part by walls of the duct. In the further sense the line is therefore a conveying means for the flowable medium.

It is therefore proposed according to the invention that on the one hand the apparatus should be sealed off from the environment by the surge chamber described above but on the other hand this surge chamber should also serve to make possible in a controlled and sealed-off manner an exchange of a flowable medium and, in particular, an exchange of gas with an internal region of the apparatus, i.e. a region of the apparatus sealed off in itself. In this way, the invention is based upon the surge chamber described above. It is thus possible for example for an aseptic blow moulding station which is mounted on a rotated turntable to be provided. The circuit resulting from the aeration system, for example in the stretching unit, advantageously has an extraction from the rotating part, on which the blow moulding station is arranged, to the stationary part of the machine. This active extraction can, as mentioned, be carried out by the now described arrangement of the modified surge chamber.

In the case of a further advantageous embodiment the apparatus has a second wall member which is movable with respect to the duct and which is arranged at a distance from the first wall member in a radial direction with respect to the axis of rotation and which is capable of being guided at least locally inside the liquid medium.

In contrast to the prior art, therefore, not only one so-called sword is provided which moves in the duct for liquid, but a second sword, and the extraction is advantageously carried out between these two swords and thus in a region which is sealed off both from the interior of the surge chamber and from the environment.

In the case of a further advantageous embodiment the line for the flowable medium thus extends at least locally between the first wall member and the second wall member in the radial direction with respect to the axis of rotation.

In the case of a further preferred embodiment the line opens into a collecting or distribution duct which is preferably designed in the form of an annular duct and out of which the gaseous medium is preferably drawn out. In addition, it would be possible for the gaseous medium to be supplied by way of this collecting or distribution duct. In this case it would also be possible only for openings which produce the flow connection with the aforesaid collecting or distribution duct to be provided in the duct of the surge chamber.

In the case of a further advantageous embodiment at least two openings which have cross-sections differing from each other in size are provided in the duct. In this case the cross-sections of these openings can be dependent upon the distance thereof from an extraction point (or supply point) of the collecting or distribution duct, it being preferable for the cross-section likewise to increase as the distance increases.

In the case of a further advantageous embodiment the aforesaid line has an opening and this opening is situated permanently above the filling level of the liquid medium in working operation of the apparatus. In this way, it is possible to prevent the separating or blocking medium of the surge chamber from being able to pass into the aforesaid line. The aforesaid opening can be made tubular in this case. In this way, one or even a plurality of tubes can extend through the duct. It would also be possible, however, for the opening, like the duct to be made continuous or also to be formed by two walls of the duct. It is advantageous for a plurality of tubes with diameters differing in size at least in part in a particularly preferred manner to be arranged over the periphery of the apparatus. These convey the gaseous medium preferably in an annular duct which acts as a collecting container. The gaseous medium can then be drawn out from the latter at one or more extraction points. The different diameters of the tubes result from the varying distances from the respective extraction point. It is advantageous for an equal volume of air to be able to flow through each hole in a manner dependent upon its size and the distance from the extraction point respectively.

It is particularly preferred for the aforesaid line to be used for drawing a gaseous medium out of a region of the apparatus. In particular, the line is used for drawing a gaseous medium out of a region of the clean room or the stretch bar. In this case this extraction can be carried out by an under-pressure, this under-pressure being for example in a range of between $-1$ and $-10$ Pa, preferably between $-2$ and $-8$ Pa, and in a particularly preferred manner a range of approximately $-5$ Pa with respect to the atmosphere.

An important component of such a stretch blow moulding machine or of such a stretch blow moulding station respectively is the stretching unit. This supports and guides the stretch bar. The stretch bar moves into the plastics material pre-form and stretches it out as far as the base of the mould. The blow moulding pressure eventually shapes the bottle and the stretching unit moves the stretch bar back out of the finished bottle again.

It is known from the prior art for the stretching unit to be connected and guided on a linear guide by way of a moment slide or stretch slide. This is important since the stretch bar usually has to be guided centrally in a very precise manner over a very long stroke which amounts to up to 450 mm. The stretch slide in this case is driven in its known design by a linear motor. The latter is mounted centrally with respect to the stretching axis and moves in and out at very high speed.

It is also known for the stretch bars to be moved by way of a guide cam.

In the prior art the mechanical system in a non-clean room is without any protection from contamination. This means that the ready shaped bottle is contaminated and so has to be cleaned hygienically in a separate module, such as a rinser.

At present no stretch blow moulding machines are known which produce plastic bottles which are blown aseptically. The mechanical system and the "non-clean sequence" of the stretching process are similar in all the current machines on the market.

It is preferable for the apparatus to have a stretching unit which stretches the plastics material pre-forms along their longitudinal direction. In this case the stretching unit has a stretch bar which is movable with respect to the plastics material pre-forms and which is capable of being introduced into the plastics material pre-forms, and the stretching unit additionally has a drive device for moving the stretch bar along the longitudinal direction thereof.

It is advantageous for the blow moulding station to have a receiving space with at least one wall for receiving the stretch bar, and the stretch bar is movable with respect to this receiving space, the drive device being advantageously arranged outside this receiving space at least for a time and a gaseous medium at a pre-set pressure P—which is above an ambient pressure in a non-sterile environment of this receiving space—being capable of being received in this receiving space. It is advantageous for a sterile medium, and in particular sterile air, to be present in the receiving space.

The drive device for moving the stretch bar can be for example a linear motor or electric motor respectively or a mechanical or hydraulic drive. It would also be possible, however, for the drive of the stretch bar to take place by way of a cam roller and a corresponding guide cam, in particular arranged in a stationary manner. This guide cam can be arranged in this case outside the clean room for example. The conveying device which conveys the blow moulding station or the blow mould respectively can be for example a blow moulding wheel which is arranged so as to be rotatable and on which a plurality of blow moulding stations of this type are arranged. It is also advantageous for the stressing device to be arranged inside the clean room and advantageously opposite the containers to be expanded.

It is advantageous for the receiving space to be connected in terms of flow to the line mentioned above for the flowable medium. In this way, it is preferable for the extraction of air out of the receiving space to take place by way of the surge chamber mentioned above. This has been found to be particularly advantageous since despite the extraction of this gaseous medium from a rotating part of the machine to a stationary part of the machine in this case, the sterile conditions can be maintained.

It would also be possible, however, for the aforesaid line, which is conveyed through the surge chamber, also to be used for supplying a gaseous medium, for example in order to permit an over-pressure inside the clean room. In this way, sterile air could also be supplied through this line from the outside to the inside, i.e. into the clean room.

In the case of a further advantageous embodiment the stretch bar is arranged on a holding device and this holding device extends through a wall of the receiving space. The stretch bar can be connected in this case by way of the holding device to the drive device, such as for example a slide element or the like. It is therefore proposed that the stretch bar should be separated from the contaminated surrounding area in such a way that it cannot come into contact with any germs or other contamination.

In addition, an easy accessibility in the cyclical cleaning of the hygienic units is nevertheless made possible by the embodiment according to the invention. By means of the inventive apparatus it is possible for the plastics material pre-forms to be deformed in a hygienic manner.

In the case of a further advantageous embodiment the entire holding device extends through an opening formed in the wall of the receiving space. This opening can be designed in the form of a slot for example in this case. In this way, it is possible for the receiving space to surround the stretch bar over its entire periphery with the exception of the aforesaid slot. In this way, the receiving space can be made cylindrical with the aforesaid slot for example. In addition, it would be possible for a sealing device to be provided which in each case seals off the slot in those regions in which the holding device is not present. This can be a sliding seal which in each case seals off those regions in which the aforesaid holding device is not present or provided respectively.

In the case of a further advantageous embodiment the apparatus has a transition space which is separated from the environment by means of at least one wall, this transition space being connected in terms of flow to the receiving space mentioned above. In this way, it is possible for example for the stretch bar to extend in the receiving space or a chamber which is acted upon with sterile air. The pressure in this receiving space is higher in this case than the air pressure of the non-sterile environment. This higher sterile pressure can thus result from an atmosphere which is also used to supply the blow moulds situated thereunder with sterile air.

A second chamber, the transition space mentioned above, can be attached to the aforesaid chamber or the receiving space respectively. A lower pressure is preferably present in this transition space than in the receiving space and the non-sterile ambient air. These two chambers, i.e. the receiving space and the transition space, are preferably connected in this case to a common slot which is continuous on one side and through which the sterile air can flow from the receiving space to the transition space. In addition, the transition space advantageously has a further slot which preferably leads in an open manner to the atmosphere.

The two aforesaid slots and the under-pressure in the transition space result in a flow movement in the direction of the transition space. A constant movement of the air from the receiving space to the transition space prevents the stretch bar from being contaminated. The constantly moving air from the non-clean atmosphere to the transition space additionally prevents the escape of air enriched with hydrogen peroxide into the atmosphere. An arrangement of this type can also be referred to as an extraction organ.

In this way, the pressure in the transition space is advantageously lower than in the environment and the receiving space, so that the lowest pressure as a whole is present in the aforesaid transition space.

It is advantageous for the two slots or openings respectively and of the receiving space and of the transition space also to be arranged in such a way that they are opposite the direction of movement of the blow moulding stations, so that a direct introduction of germs into the receiving space is prevented.

In the case of a further advantageous embodiment a wall is arranged between the receiving space and the transition space.

As mentioned above, the stretch bar can be held by way of a so-called stretching sword, i.e. the holding device, and it extends inside this receiving space. The holding device or stretching sword respectively can be driven by a linear motor and advantageously projects through the two slots mentioned above and, in a particularly preferred manner, is mounted so as to be displaceable in the horizontal plane. On account of this arrangement the stretch bar extends only in the sterile zone and thus remains aseptically clean.

It is advantageous for the blow moulding slide also to be designed in a corresponding manner to this stretching sword or holding device respectively. The blow moulding nozzle, which is likewise placed on the plastics material pre-forms in order to expand them, can be arranged on this blow moulding slide. The blow moulding slide is preferably conveyed below the stretch bar, advantageously on the same linear guide. A corresponding sword of the blow moulding slide likewise advantageously extends through the receiving space and in a particularly preferred manner also through the transition space.

In addition, it is possible for a corresponding sword or holding device respectively of the blow moulding slide to be guided by way of the two openings in the form of slots mentioned above. In the sterile environment of the receiving space the blow moulding slide is connected to the blow moulding piston and moves inside the extraction organ like the above-mentioned holding device or stretching sword respectively. The blow moulding piston is advantageously raised by way of the aforesaid blow moulding slide or a cam mounted in a stationary manner respectively. In the case of a further advantageous embodiment the receiving space is connected in terms of flow with the clean room. In addition, it is preferable for an extraction device to be provided in order to draw a gaseous medium out of the transition space. In this case this extraction device can advantageously convey the gaseous medium to the (non-sterile) environment. The extraction device can have a valve device in this case.

In the case of a further advantageous embodiment the stretch bar is arranged in an eccentric manner with respect to the receiving space. In this case it is advantageously provided that the receiving space has a specific minimum volume in order to ensure this sterility The stretch bar is advantageously guided in an eccentric manner with respect to it, in order to be able to arrange it comparatively close to the opening of the receiving space in this way.

In the case of a further advantageous embodiment the receiving space is made substantially cylindrical. The stretch bar is guided inside this cylinder, and is advantageously arranged in an eccentric manner with respect to the centre of the cylindrical receiving space.

The present invention further relates to a method of shaping plastics material pre-forms into plastics material containers, in which the plastics material pre-forms are conveyed with at least one blow moulding station, which is arranged on a rotable conveying device, through a clean room and are acted upon with a gaseous medium at least for a time during this conveying in order to expand them. In this case this clean room is separated from an environment by means of at least two walls movable relative to each other, the clean room being bounded off with respect to the environment by means of a sealing device into a region of the walls movable with respect to each other and the sealing device having a first continuous duct which is filled with a liquid medium and in which a first continuous wall member movable with respect to this duct is guided at least locally inside the liquid medium.

According to the invention a line of flowable medium extends in at least one portion of the duct, this flowable medium being conveyed through this portion of the duct and being permanently separated from the liquid medium present in the duct.

It is advantageous for the plastics material pre-forms to be stretched in their longitudinal direction by means of a stretch bar, the stretch bar being moved with respect to the plastics material pre-forms in the longitudinal direction.

It is advantageous for the stretch bar to move inside a receiving space. This receiving space is bounded off from a non-sterile environment by means of at least one wall. In addition, the receiving space is acted upon with a gaseous medium and a pressure of this gaseous medium inside the receiving space is higher than the ambient pressure in a non-sterile environment. It is advantageous for the plastics material pre-forms to be acted upon with sterile air.

In the case of a preferred method a holding device, on which the stretch bar is arranged and which preferably extends through an opening in the receiving space, is moved with respect to the receiving space in order to move the stretch bar with respect to the plastics material pre-form. It is therefore advantageous for the receiving space to be arranged fixed with respect to the conveying device and advantageously also fixed with respect to the individual blow moulding stations in the longitudinal direction of the plastics material pre-forms It is advantageous in this case for the stretch bar to be arranged fixed with respect to the aforesaid holding device.

BRIEF DESCRIPTION OF THE DRAWINGS

Further advantages and embodiments are evident from the accompanying drawings. In the drawings

DETAILED DESCRIPTION OF THE INVENTION

Figure 1:
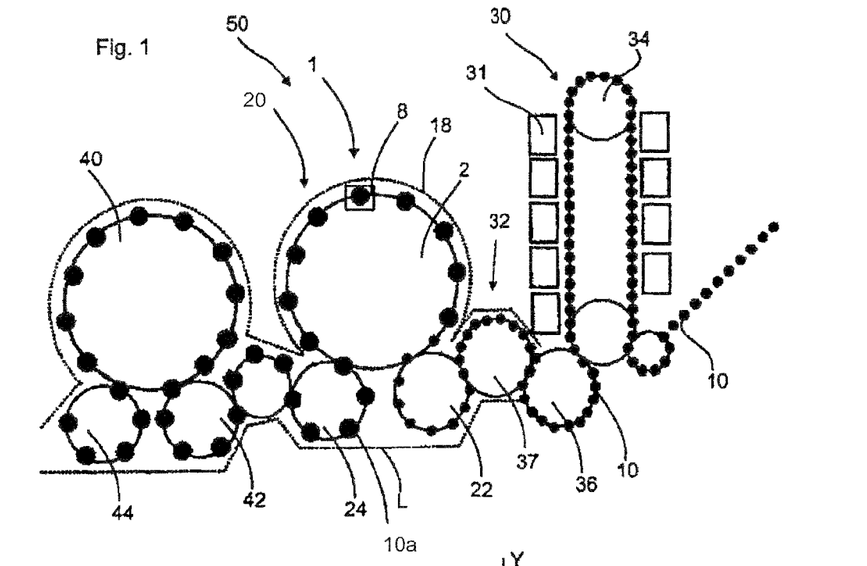
FIG. 1 is a diagrammatic illustration of a plant for producing plastics material containers.

FIG. 1 is a diagrammatic illustration of a plant for producing plastics material containers according to the prior art. This plant 50 has a heating device 30 in which plastics material pre-forms 10 are heated. In this case these plastics material pre-forms 10 are conveyed through this heating device 30 by means of a conveying device 34, such as a circulating chain here, and are heated in this case by a plurality of heating elements 31

This heating device 30 has attached to it a transfer unit 36 which transfers the pre-forms 10 to a sterilization device 32. This sterilization device 32 likewise has in this case a conveying wheel 37 and sterilization elements can be arranged on this conveying wheel 37 or even in a stationary manner. Sterilization by hydrogen peroxide gas or even by electromagnetic radiation is possible for example in this region. In particular, an internal sterilization of the pre-forms is carried out in this region.

The reference number 20 designates in its entirety a clean room, the external boundaries of which are indicated here by the dotted line L. In a further preferred embodiment the clean room 20 is not only arranged in the region of the conveying wheel 2 and the filling device 40, but it already starts if possible in the region of the heating device 30, the sterilization device 32, the supply of the plastics material pre-forms and/or the production of the plastics material pre-forms. It is evident that this clean room 20 starts in the region of the sterilization unit 32. Separating-out devices can be provided in this region in order to introduce the plastics material pre-forms into the clean room 20 without too much gas flowing inside the clean room in this case and thus being lost.

As indicated by the broken line L, the clean room is adapted to the external shape of the individual components of the plant. In this way the volume of the clean room can be reduced.

The reference number 1 designates a shaping apparatus as a whole, in which a plurality of blow moulding stations or shaping stations 8 are arranged on a conveying wheel 2 only one of these blow moulding stations 8 being shown here. The plastics material pre-forms 10 are expanded by these blow moulding stations 8 to form containers 10a. Although it is not shown in detail here, the entire area of the conveying device 2 is not situated inside the clean room 20, but the clean room 20 or isolator is designed as it were in the form of a mini isolator inside the apparatus as a whole. In this way it would be possible for the clean room to be designed in the form of a duct at least in the region of the shaping apparatus 1.

The reference number 22 relates to a supply device which transfers the pre-forms to the shaping device 1, and the reference number 24 relates to a removal device which removes the plastics material containers 20 produced from the shaping apparatus 1. It will be seen that in the region of the supply device 22 and the removal device 24 the clean room 20 has recesses in each case which receive these devices 22, 24. In this way, a transfer of the plastics material pre-forms 10 to the shaping apparatus 1 or a transfer of the plastics material containers 10a from the shaping apparatus 1 can be carried out in a particularly advantageous manner.

The expanded plastics material containers are transferred to a filling device 40 by a transfer unit 42 and they are then removed from this filling device 40 by way of a further conveying unit 44. In this case the filling device 40 is also situated inside the aforesaid clean room 20. In the case of the filling device it would also be possible for the entire filling device 40 with for example a reservoir for a beverage not to be arranged completely inside the clean room 20, but also in this case only those areas in which the containers are in fact guided. In this respect, it would also be possible for the filling device to be designed in a similar manner to the apparatus 1 for shaping plastics material pre-forms 10.

As mentioned, the clean room 20 is reduced in the region of the apparatus 1 to as small an area as possible, namely essentially to the blow moulding stations 8 themselves. As a result of this compact design of the clean room 20 it is possible in an easier and more rapid manner to produce a clean room generally and, in addition a lower outlay is required in order to keep the system sterile in the operative phase. Less sterile air is also necessary, and this leads to smaller filter units and the risk of uncontrolled swirl formation is also reduced.

Figure 2:
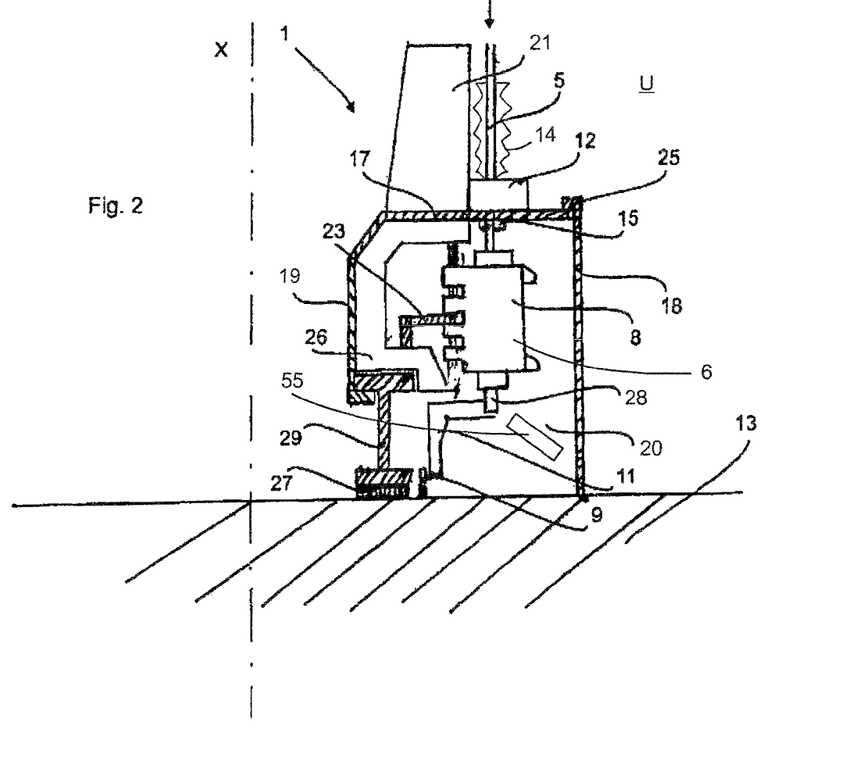
FIG. 2 is a view of a clean room in the region of a blow moulding station.

FIG. 2 is a detailed illustration of the apparatus 1 according to the prior art in the region of a blow moulding station 8. A plurality of blow moulding stations 8 of this type are moved by a conveying device 2 or a carrier so as to rotate about an axis x. As is evident from FIG. 2, the blow moulding station 8 is guided inside the clean room 20 which is designed in the form of a duct here. This clean room 20 is closed off by a movable lateral wall 19 and a cover 17 formed in one piece with this lateral wall 19. In this case this lateral wall 19 and the cover 17 rotate jointly with the blow moulding station 8.

The reference number 18 relates to a further wall which bounds the clean room 20. This wall 18 is here a wall which is situated on the outside and which is arranged in a stationary manner. The cover 17 and the wall 18 have provided between them a sealing device 25 which seals off from each other the elements 17 and 18 movable with respect to each other, for example, as mentioned above, by using a surge chamber. The lower region of the wall 18 is arranged on a floor 13 in a fixed and sealed manner A carrier 26, which likewise moves in a rotating manner and on which a holding device 23 which holds the blow moulding station 8 is in turn provided, is provided inside the clean room 20 and in this case abutting directly against the wall 19.

The reference number 11 relates to a follower device which can be actuated by a guide cam 9 in order to open and close the blow moulding station on its path through the clean room 20, in order in particular to introduce the plastics material pre-form into the blow moulding station and also to remove it again. In this case a guide cam 9 is also arranged inside the clean room 20. It would also be possible, however, for a portion 11 below the individual blow moulding stations 8 to be brought out of the clean room 20.

The conveying device 2 can have still further elements which are arranged above the clean room 20.

In this case the carrier 26 is arranged in a fixed manner on a holding body 29 and this holding body in turn is movable with respect to the floor 13. In this case the reference number 27 relates to a further sealing device which in this area too seals off the regions 13 and 29 which are movable with respect to each other.

The reference number 5 relates to a stretch bar which is movable with respect to the blow moulding station in order to stretch the plastics material pre-forms 10 in their longitudinal direction. In this case a slide 12 opposite which the stretch bar is movable in the direction Y is arranged on the cover 17. The reference number 21 relates to a further holding means for this slide 12 of the stretch bar 5.

It is evident that specific regions of the stretch bar are both outside the clean room 20 and inside the clean room 20 during the blow moulding procedure. For this purpose it is possible for a protective device such as a folding bellows 14 to be provided outside the clean room 20 or above the slide 12, the folding bellows 14 surrounding the stretch bar 5 so that no region of the stretch bar 5 comes directly into contact with the outer environment. The reference letter U designates the (non-sterile) environment of the clean room 20. The reference number 28 designates a carrier for carrying a floor mould which likewise forms a component of the blow mould. This carrier is likewise movable in the direction Y in this case.

The reference number 55 relates to a sterilization device which in this case is preferably arranged in the interior of the clean room 20 and is used for the sterilization of the individual shaping stations or components of these shaping stations 8. This sterilization device 55 can act in this case upon the shaping stations 8 for example with hydrogen peroxide or another sterilization agent. In this case the sterilization device 55 can be arranged so as to be stationary and the shaping stations can move with respect to this sterilization device 55. This sterilization device or stressing device 55 can be situated on the conveying wheel 2 or on the vertical wall 18 or can be arranged so as to be generally stationary and can consist of nozzles or the like. In addition, it is advantageous for sterile air to be introduced into the clean room 20 in order to sterilize the clean room 20 by way of the aeration system.

The blow moulds (not shown) are arranged inside the blow mould carriers 6. More precisely, two blow mould carrier parts can be provided in this case which are pivotable with respect to each other and which hold one blow mould part in each case. The blow moulds can be opened by this pivoting procedure for the introduction of plastics material pre-forms and for the removal of finished, blow-moulded containers. These blow mould carriers and blow moulds are likewise arranged inside the clean room in this case.

It would also, however, be possible and preferred (other than as shown in FIG. 2) for the conveying device 2 or the carrier to have a C-shaped external periphery which also forms the outer walls of the clean room in part. In this way, this C-shaped clean room wall turns with the conveying device 2, i.e. the blowing wheel. In this embodiment the lower boundary of the clean room is arranged at a distance from the floor 13 and moves relative to the floor. In this way, the clean room can be made even smaller than as shown in FIG. 2. In this case it is preferable for this C-shaped profile of the conveying device, which forms both an inner wall and a lower and upper cover of the clean room here, to be sealed off only with respect to the outer wall of the clean room. This outer wall is advantageously arranged in a stationary manner in this case.

Figure 3:
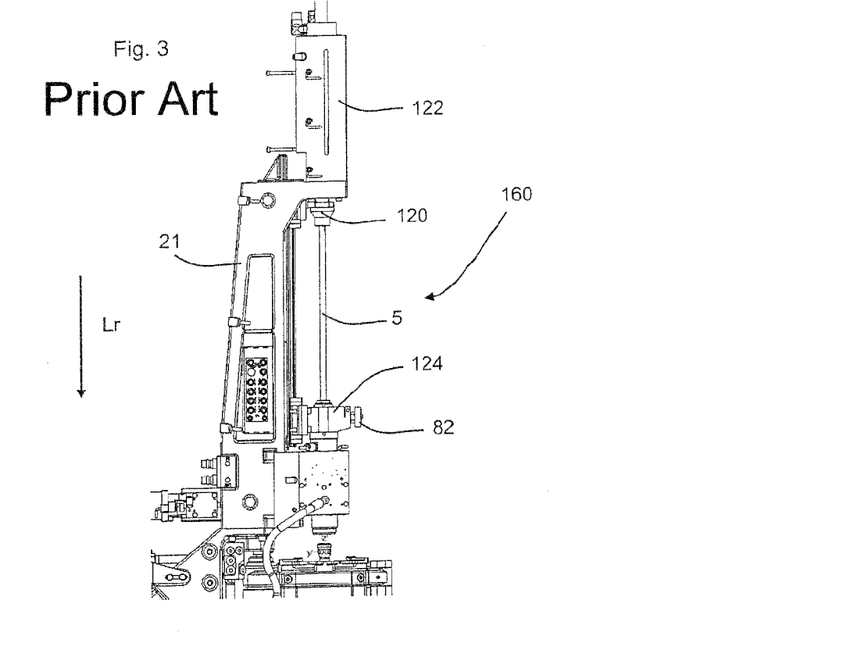
FIG. 3 is an illustration of a stretching unit in accordance with the internal prior art of the Applicants.

FIG. 3 is a side view of a stretching unit 160 according to the internal prior art of the Applicants. This stretching unit 160 has in this case a carrier 21 on which a stretch slide 120 is arranged. A stretch bar 5 is once more guided with this stretch slide. The reference number 124 designates a blow moulding slide, i.e. a slide which places a blow moulding nozzle on the plastics material pre-forms. The reference number 82 designates a guide roller which can roll for example with respect to a guide cam in order to cause the movement of the blow moulding slide in this way. The reference number 122 designates a drive device, such as a linear motor, which drives the movement of the stretch bar. Instead of the linear motor, however, it would also be possible for a pneumatic or hydraulic drive to be provided or likewise a stretching cam.

The reference Lr in the figures relates to the direction of movement of the stretch bar in order to stretch the plastics material pre-forms. This direction of movement corresponds to the direction of movement of the stressing device and advantageously also to the longitudinal direction of the plastics material pre-forms.

Figure 4:
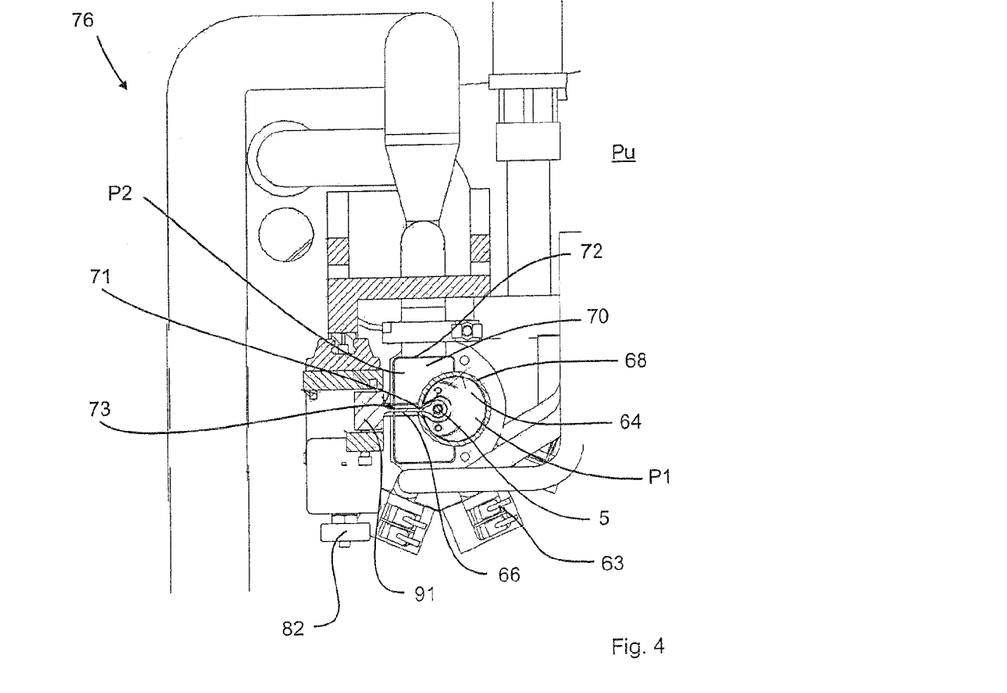
FIG. 4 is a plan view of an advantageous stretching unit.

FIG. 4 is a plan view of a stretching unit 60 according to the invention. In this case the stretch bar 5 is once again evident, which in FIG. 4 moves at a right angle to the plane of the figure in order to stretch the plastics material pre-forms (not shown). This stretch bar 5 moves inside a receiving space 64 which in this case is made cylindrical. In addition, this receiving space 64 has an opening slot through which a holding device 66 or a sword holding the stretch bar 5 respectively is guided. A pressure P1, which is at least higher than a pressure Pu of the non-sterile environment outside, is present inside this receiving space 64.

The reference number 70 designates a transition space through which the holding device 66 is likewise guided. In addition, this transition space is connected in terms of flow to the receiving space 64. A pressure P2, which is lower than the pressure P1, is present in this transition space, so that an air flow can pass into the transition space 70 solely from the receiving space 64. The reference number 72 designates a wall which bounds a transition space 70. In a corresponding manner the reference number 68 designates a wall which bounds the receiving space 64. The gaseous medium can be removed out of the transition space 70 by way of a removal device 76 which is connected in terms of flow to the transition space 70. This is particularly relevant to the sterilization process.

The reference number 91 designates a stretch slide on which the holding device 66 and the stretch bar 5 [are] once more arranged in order to permit a movement in this way. The reference number 82 designates once again a cam roller which is used for moving the blow moulding unit.

The reference numbers 63 designate valve units for supplying the blowing air.

Figure 5:
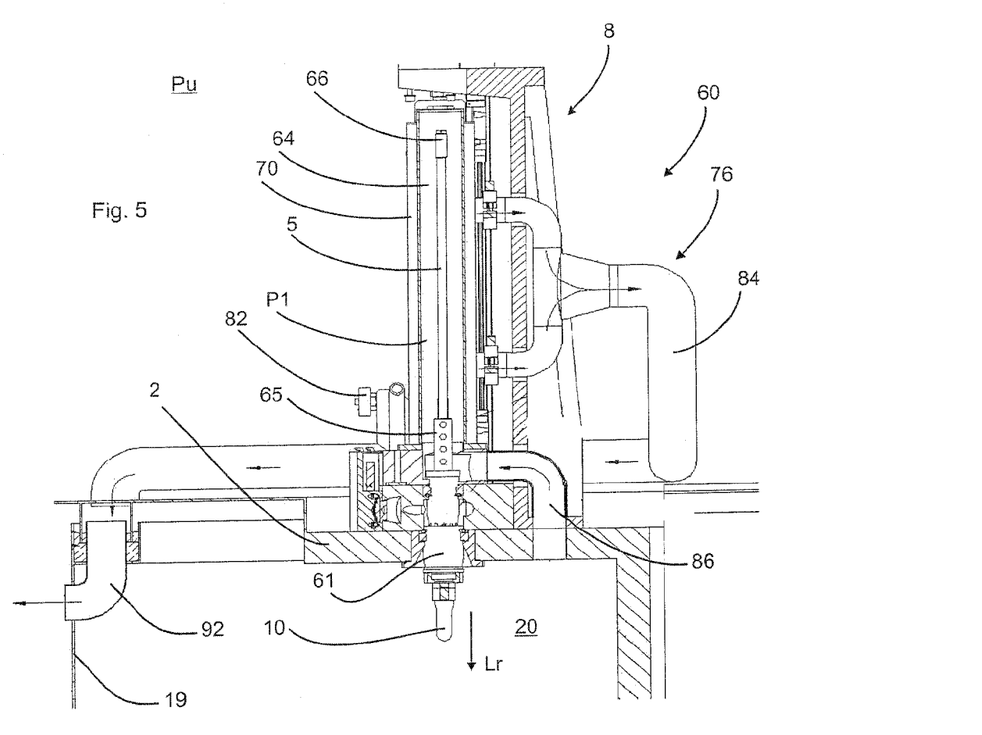
FIG. 5 is a side view of the stretching unit as shown in FIG. 4.

FIG. 5 is a further illustration of the stretching unit 60, in which in particular the flow paths of the air are illustrated. The air flowing into the receiving space 64 is derived from the atmosphere below the blow moulding station 8. The bounding off from the environment is carried out by a standing cover. The sterile air rinses inside the receiving space 64 the entire stretch bar as well as the holding device 66 (not shown in FIG. 5) and also the corresponding sword of the blow moulding slide which is attached to the body 98 at the rear. The reference number 61 designates the blow moulding piston which is applied to the plastics material pre-forms 10. The reference number 20 designates a clean room. Here too the reference number 19 again designates a stationary seal. The reference number 2 the rotating blow moulding wheel.

The air passes from the clean room 20 into the receiving space 64 by way of a connecting line 86. The contaminated air can be extracted through the attached extraction means 76 by way of the two openings 71 and 73 (cf. FIG. 4). No non-sterile or contaminated air therefore passes into the system and, conversely, no hydrogen peroxide passes out of the system into the environment during the sterilization process. The procedures described here take place, as mentioned above, in the rotating unit. The extraction can take place by way of a stationary unit. A so-called surge chamber can be provided as a sealing device for the connection between the stationary and the moving part. The reference number 84 relates to an extraction line which is a component of the extraction means 76. Contaminated air is extracted out of the apparatus 1 for the removal line 92.

Figure 6:
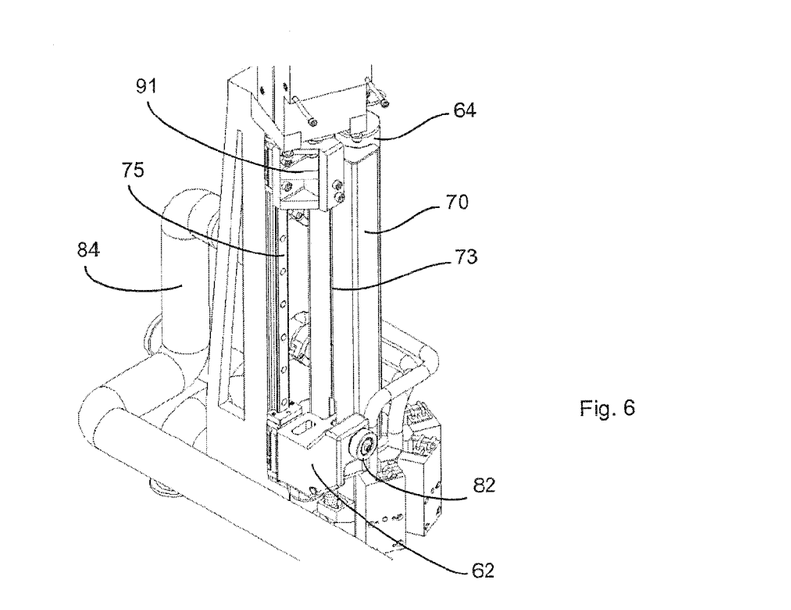
FIG. 6 is a perspective view of the stretching unit shown in FIG. 5.

FIG. 6 is a perspective illustration of a stretching unit 60 according to the invention. In this case the receiving space 64 and the transition space 70 are again evident. In addition, the removal device or the line 76, by way of which air can be extracted out of the transition space, may be seen. It will be seen that both the slide 91 for the movement of the stretch bar and the slide 62 for the movement of the blow moulding nozzle can be guided by the same carrier 75. In this case the slide 62 is thus always situated below the slide 91.

In the illustration shown in FIG. 6 it will be seen that the carrier 75 and the opening 73 are orientated transversely to each other, i.e. the slide 91 and also the slide 62 are an angled part.

Figure 7:
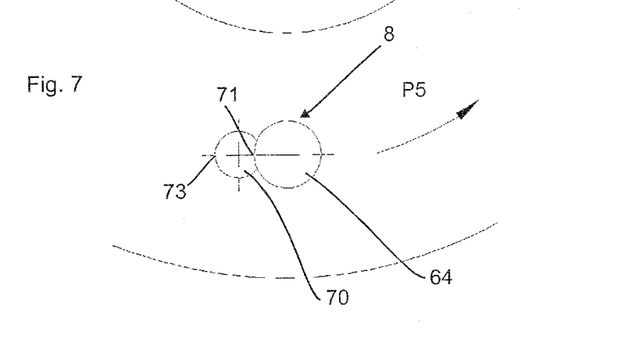
FIG. 7 is a diagrammatic illustration of a stretching unit according to the invention.

FIG. 7 is a roughly diagrammatic illustration of the apparatus according to the invention. In this case the arrow P5 designates the direction of movement of the individual blow moulding stations 8.

In addition, the two slots or openings 71 and 73 of the receiving space 64 and of the transition space 70 are also evident. It will be seen that these slots are directed contrary to the direction of movement in each case in the direction of movement P5.

Figure 8A:
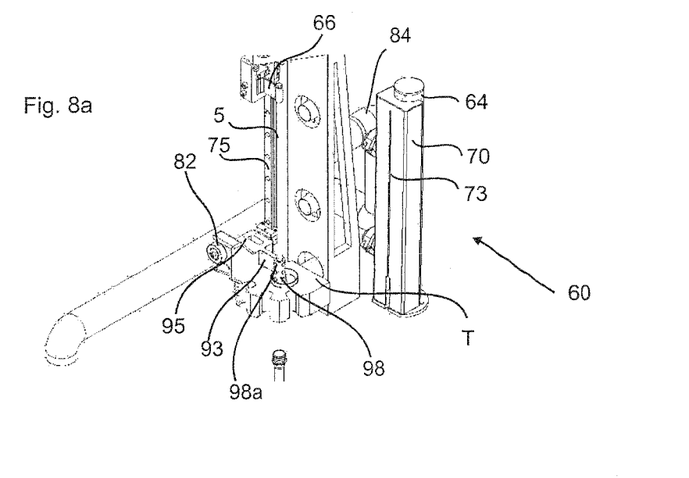
FIGS. 8a, 8b are two perspective illustrations of a stretching unit according to the invention.
Figure 8B:
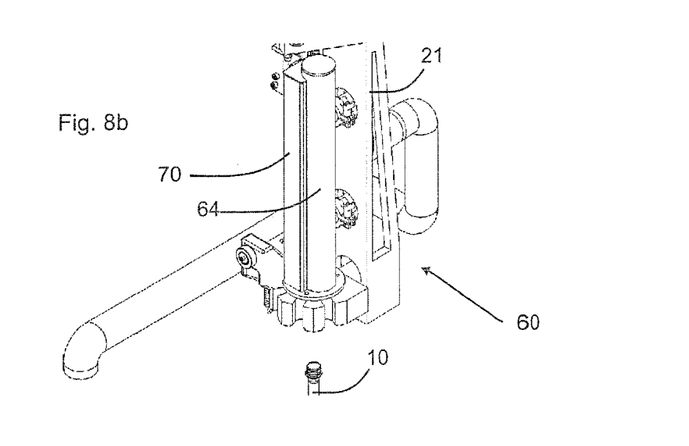

FIGS. 8a and 8b are two illustrations of the stretching station, in which the receiving space 64 and the transition space 70 are shown separately from the stretch bar 5 in one illustration (cf. FIG. 8a) for purposes of explanation. In particular, the opening slot 73, with respect to which the holding device 66 is moved with the stretch bar 5, is again evident in FIG. 8a.

The reference number 75 designates a carrier with respect to which the entire slide with the holding device 66 slides. The reference number 62 designates the slide for the blow moulding unit which likewise slides with respect to the carrier 75. The reference number 98 on the one hand designates a guide member for the stretch bar 5 which, however, has a plurality of openings 98a by way of which a sterilization agent can be introduced into the receiving space 64.

FIG. 8b is a complete illustration of the apparatus according to the invention, in which the receiving space 64 and the transition space 70 are once more evident hers The reference letter T designates the separation plane between the non-sterile and the sterile room in each case in the respective figures.

It is preferable for the atmosphere inside the receiving space 64 to be approximately 10 Pa higher than the ambient pressure. In this case it is advantageous for this atmosphere inside the receiving space to be supplied with sterile air.

The pressure inside the transition space 70 is, as mentioned above, below the pressure inside the receiving space and also advantageously below the ambient pressure. It is advantageous for the pressure inside the transition space to be approximately 5 pascals below the ambient pressure.

The individual drive devices for the stretch bar and/or the drive devices for the blow moulding nozzles and/or the lifting device of the blow moulding piston are advantageously situated outside the atmosphere or outside the receiving space 64 and, in a particularly preferred manner, also outside the transition space.

It will be seen, in particular, from the figures that the receiving spaces are bounded from one another in each case by chambers or walls respectively.

As a result of the individual pressure ratios, a flow can take place from the receiving space 64 into the transition space 70 and a flow can also take place in the other direction from the environment into the transition space 70. In addition, it is possible for there to be a connection between the receiving space 64 and the atmosphere situated under it, i.e. in particular the clean room, which in this case is likewise advantageously under an increased pressure of preferably approximately 10 Pa.

In addition, it is advantageously also possible for the stretch bar 5 to be capable of being adjusted in a horizontal plane by way of the holding device 66. In the case of a further advantageous embodiment it is also possible for the receiving space 64 or the extraction organ respectively to be capable of being removed, without the stretching unit itself or the stretch bar 5 respectively being removed for this purpose (cf. FIG. 5). As is made clear in particular with reference to FIG. 7, the individual slots or openings 71, 73 respectively are preferably orientated in a direction opposed to the operative direction of the process.

Figure 9:
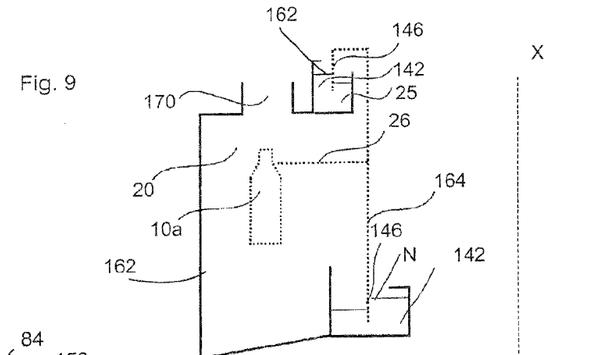
FIG. 9 is a diagrammatic illustration to explain a seal.

FIG. 9 is a diagrammatic illustration to explain a sealing device. A housing part 162 which is arranged in a stationary manner is shown here. A further housing part 164, which jointly with the housing part 162 or the wall 162 respectively bounds the clean room 20, is arranged so as to be movable with respect thereto. A carrier 26 with the blow moulding station (not shown) is also provided on this wall portion 164 which is movable in a rotating manner.

A sterile gas is introduced into the sterile room 20 by way of an insertion opening 170. In order to seal off the rotating components from the stationary components, two ducts 142 are provided here which are advantageously filled in each case with a bacteriostatic solution or for example with water. A wall portion 146 projects in this case both into the lower container or the lower duct 142 respectively and into the upper duct 142, namely in such a way that this wail 146 also dips into the respective liquid. As a result of the immersion of this wall 146 into the two ducts 142 the clean room 20 as a whole is sealed off. The reference letter N relates to a filling state of the liquid in the interior of the duct. Since an over-pressure is present in the clean room 20, there is a lower filling state in each case on the side of the duct 142 facing the clean room than on the side of the duct 142 facing the environment.

Figure 10:
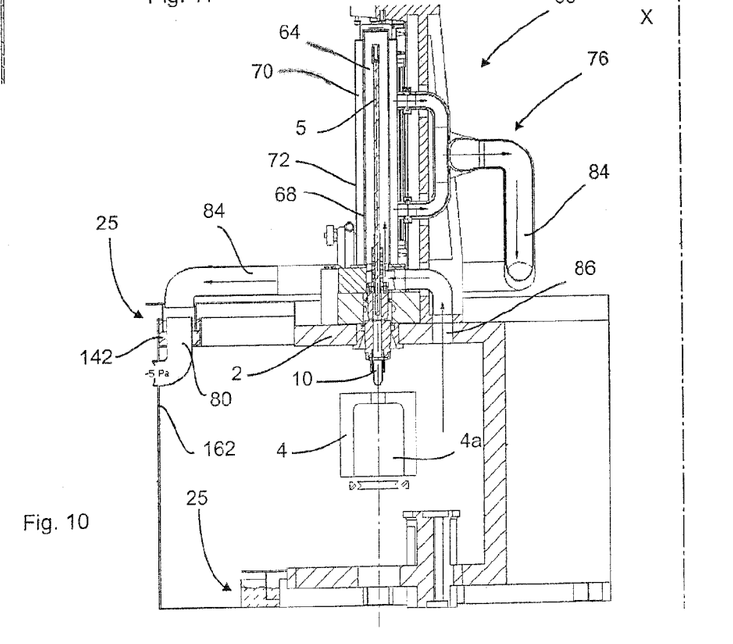
FIG. 10 is an illustration of an apparatus according to the invention to explain the invention.

FIG. 10 is a further illustration of an apparatus 1 according to the invention. This illustration is similar in this case to the illustration in FIG. 5. In addition, however, a blow mould 4 is also evident, which in its interior forms the cavity 4a inside which the plastics material pre-forms 10 are expanded by being acted upon with compressed air. The extraction line 84 is also shown once more. The reference number 25 also designates in this case the two sealing devices, in which case it will be seen that a line 80 extends through the sealing device 25 or through the duct 142 respectively. This line 80 can be designed in this case in the manner of a tube and can be arranged on only one side of the duct 142. It would also be possible, however, for the line 80 to be formed by two walls and thus likewise to extend completely in the peripheral direction with respect to the axis of rotation X.

Figure 11:
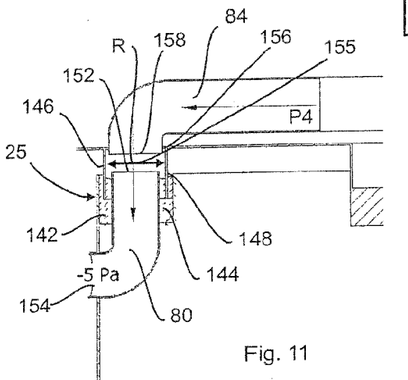
FIG. 11 is an enlarged view of the apparatus shown in FIG. 10.

FIG. 11 shows an enlarged illustration of the portion of the sealing device 25. The line 80 which extends through the duct 142 or the duct portions 142, 144 respectively is again evident. The reference number 146 designates once again the wall portion which dips into the separating liquid. The reference number 148 designates a further wall portion which likewise dips into the separating liquid. The tube 80 extends in the radial direction R between these two wall portions 146 and 148. In this way, the room area 155 which is formed between an opening 152 of the line 80 and an opening 158 of the line 84 is likewise both separated off from the environment and separated off from the clean room.

As is evident from the arrow P4, the gaseous medium or the air respectively flows in the direction of the opening 154 in this case. The line 80 is thus advantageously designed to be stationary together with the duct 142, whereas the extraction line 84 with the opening 158 is designed to be movable in a rotating manner. The reference number 156 designates a carrier on which the extraction line 84 is arranged in a fixed and, in particular, also a gas-tight manner.

In this way, the aseptic blow moulding station is mounted in this case on the rotating turntable and a circuit resulting from the aeration system in the stretching unit 60 causes an extraction from the rotating part—on which the blow moulding station is arranged—to the stationary part.

As mentioned above, a plurality of blow moulding stations are usually provided on a rotating turntable. The blow moulding wheel 2 rotates about the axis of rotation X and is blocked off in this case from the atmosphere by the walls described. This wall also has in this case a guideway for a liquid, i.e. the ducts 142 and 144. The distance between these two wall portions in the radial direction R is selected in such a way that the extraction tube 80 mentioned can be enclosed between them. The end, or the opening respectively, of the line 80 does not touch the sealing liquid during this and runs at a defined distance. The end of the aforesaid extraction means projects in this way out of the sealing liquid, so that air can be drawn out. An under-pressure of 5 Pa occurs in the surge chamber as a result of this extraction. This under-pressure draws contaminated air out of the system by way of the extraction tube 80 and the line 80.

Figure 12:
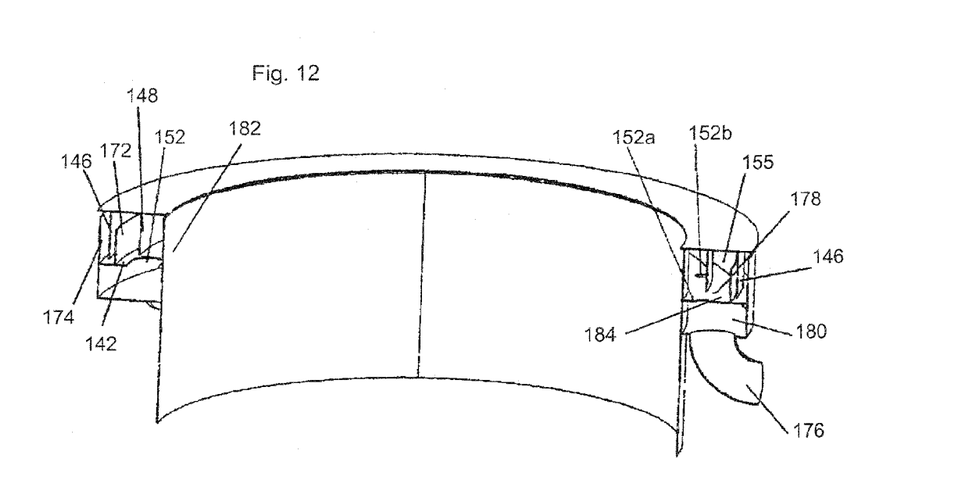
FIG. 12 is a view of a further embodiment of the apparatus according to the invention.

FIG. 12 shows a further embodiment of an apparatus according to the invention. Here a collecting or distribution duct 180 for the flowable medium is provided below the annular duct, and is connected in terms of flow to the annular duct by means of a plurality of openings 152, 152a—152i (cf. FIG. 13). The line for the flowable medium inside the duct 142 is formed in this case by the walls 172 and 182. The reference number 174 designates an outer wall of the duct 142. The flowable medium is supplied or removed respectively by way of a central line 176. The reference number 184 designates a bottom of the duct 142. The extraction line 84 or the connection thereof to the duct 142 is not shown here. In addition, it would also be possible for hoses (optionally of different cross-sections) to open into the collecting or distribution duct starting from the duct 142. The lines 80 can also be designed in the form of (optionally flexible) hoses.

Figure 13:
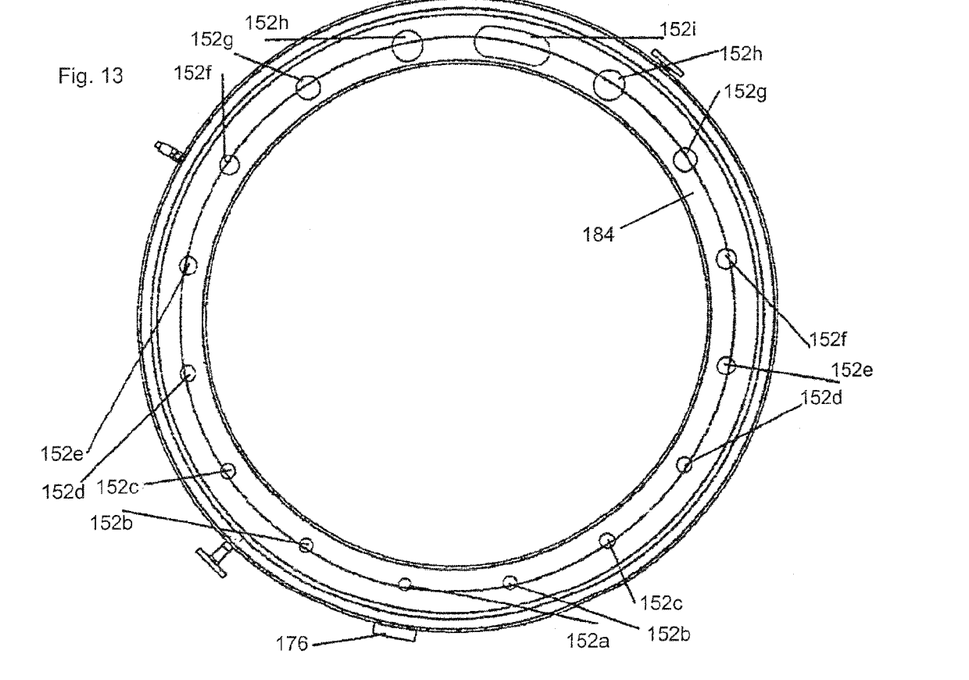
FIG. 13 is a plan view of the apparatus as shown in FIG. 12.

FIG. 13 is a plan view of the apparatus shown in FIG. 12. It will be seen that a plurality of openings 152a, 152b, 152i are provided here, these openings being distributed in the peripheral direction. An opening cross-section of these openings increases in this case from the opening 152a, in the region of which the line 176 is also present, to the opening 152i, which is at the maximum distance from the line 176 here. The bottom 184 here is symmetrical with respect to an axis which extends centrally through the two openings 152a and 152i in each case. The aforesaid openings can also have attached to them tubes which project into the duct 142.

The Applicants reserve the right to claim all the features disclosed in the application documents as being essential to the invention, insofar as they are novel either individually or in combination as compared with the prior art.

LIST OF REFERENCES 1 shaping apparatus
2 conveying wheel
4 blow mould
4a cavity
5 stretch bar
6 blow mould carrier
8 blow moulding/shaping stations
9 guide cam
10 plastics material pre-forms
10a containers
11 follower device
12 slide, stressing device
13 floor
14 folding bellows
17 cover
18 further wall
19 lateral wall
20 clean room
21 holding means for slide
22 supply device
23 holding device
24 removal device
25 sealing device
26 carrier
27 further sealing device
28 carrier for carrying a floor mould
29 holding body
30 heating device
31 heating elements
32 sterilization device
34 conveying device
36 transfer unit
37 conveying wheel
40 filling device
42 transfer unit
44 conveying unit
50 plant for producing plastics material containers
55 sterilization device
60 stretching unit
61 blow moulding piston
62 slide for the movement of the blow moulding nozzles 63 valve unit
64 receiving space
66 holding device, sword
68 wall
70 transition space
71 opening (opening slot) of the receiving space 64
72 wall of the transition space
73 opening (opening slot) of the transition space
75 carrier
76 removal device
80 line
82 guide roller
84 extraction line
91 slide for the movement of the stretch bar
92 removal line
98 body
120 stretching slide
122 drive device
124 blow moulding slide
142 ducts/container
144 duct portion
146 wall portion
148 further wall portion
152 opening
152a-i openings
154 further opening
155 room area
156 carrier
158 further opening
160 stretching unit
162 housing part/wall
164 further housing part
170 insertion opening
172 wall
174 outer wall
176 line
180 collecting or distribution duct
182 wall
184 bottom
L dotted line
Lr direction of movement of the stretch bar 5
N filling state of the liquid
U non-sterile environment
X axis of rotation
P1 pressure in the receiving space
P2 pressure in the transition space
P4 arrow
P5 direction of movement of the blow moulding stations
Pu pressure in the (non-sterile) environment
R radial direction
T separation plane

The invention claimed is:

1. An apparatus for the shaping of plastics material pre-forms into plastics material containers with at least one blow moulding station which is arranged on a conveying device rotatable about a pre-set axis of rotation (D), wherein the blow moulding station has a blow mould and this blow mould forms a cavity in the interior of which the plastics material pre-forms are capable of being expanded by being acted upon with a gaseous medium to form the plastics material containers, with a stressing device, which acts upon the plastics material pre-forms with the gaseous medium in order to expand them, and with a clean room, which surrounds the blow moulding station at least in part, wherein this clean room is bounded off from an environment by at least two walls which are movable relative to one another, and the apparatus has a sealing device which bounds off from the environment the clean room in a region of the walls movable relative to one another, wherein the sealing device has a first continuous duct, which is capable of being filled with a liquid medium, as well as a first continuous wall member which is movable with respect to this duct and which is capable of being guided at least locally inside the liquid medium, wherein a line for a flowable medium extends in at least a portion of the duct, wherein this flowable medium is capable of being conveyed through this portion of the duct and is permanently separated from the liquid medium present in the duct, and wherein the apparatus has a second wall member which is movable with respect to the duct and which is arranged at a distance from the first wall member in a radial direction (R) with respect to the axis of rotation (D) and which is capable of being guided at least locally into the liquid medium.

2. The apparatus according to claim 1, wherein the line for the flowable medium extends at least locally between the first wall member and the second wall member in the radial direction with respect to the axis of rotation.

3. The apparatus according to claim 1, wherein the line opens into an annular duct out of which the gaseous medium is drawn.

4. The apparatus according to claim 1, wherein at least two openings which have cross-sections (R) differing from each other in size are provided in the duct.

5. The apparatus according to claim 1, wherein the line has an opening and this opening is situated permanently above the filling level (N) of the liquid medium in working operation of the apparatus.

6. The apparatus according to claim 1, wherein the line is used for drawing a gaseous medium out of a region of the apparatus.

7. The apparatus according to claim 1, wherein the apparatus has a stretching unit which stretches the plastics material pre-forms along their longitudinal direction (Lr), wherein the stretching unit has a stretch bar which is movable with respect to the plastics material pre-forms and which is capable of being introduced into the plastics material pre-forms, and the stretching unit additionally has a drive device for moving the stretch bar along the longitudinal direction (Lr) thereof.

8. The apparatus according to claim 7, wherein the blow moulding station has a receiving space with at least one wall for receiving the stretch bar, and the stretch bar is movable with respect to this receiving space, and the drive device is advantageously arranged outside this receiving space at least for a time, and a gaseous medium at a pressure (P1)—which is above an ambient pressure (Pu) in a non-sterile environment of this receiving space—is capable of being received in this receiving space.

9. The apparatus according to claim 6, wherein the receiving space is connected in terms of flow to the line for the flowable medium.

10. The apparatus according to claim 1, wherein the apparatus has a transition space which is separated from the environment (U) by at least one wall, wherein this transition space is connected in terms of flow to the receiving space.

11. The apparatus according to claim 2, wherein the apparatus has an extraction device in order to draw a gaseous medium out of the transition space.

12. A method of shaping plastics material pre-forms into plastics material containers, using the apparatus according to claim 1, wherein the plastics material pre-forms are conveyed with at least one blow moulding station, which is arranged on a movable conveying device, through a clean room and are acted upon with a gaseous medium at least for a time during this conveying in order to expand them, and this clean room is separated from an environment by at least two walls movable relative to each other, wherein the clean room is bounded off with respect to the environment by a sealing device into a region of the walls movable with respect to each other, and the sealing device has a first continuous duct which is filled with a liquid medium and in which a first continuous wall member movable with respect to this duct is guided at least locally inside the liquid medium, wherein a line for a flowable medium extends in at least a portion of the duct, wherein this flowable medium is conveyed through this portion of the duct and is permanently separated from the liquid medium present in the duct.

13. The apparatus according to claim 1, wherein the line extends through the duct or a portion of the duct.

14. The apparatus according to claim 1, wherein a portion of the first wall member is guided into the separating liquid.

15. The apparatus according to claim 1, wherein a portion of the second wall member is also guided into the separating liquid.

16. The apparatus according to claim 1, wherein the tube extends in the radial direction R between first and second wall members, wherein in this way, a room area which is formed between an opening of the line and an opening of an extraction line is likewise both separated off from the environment and separated off from the clean room.

17. The apparatus according to claim 1, further comprising an extraction line, wherein line is designated to be stationary together with the duct, whereas the extraction line with the opening is designed to be movable in a rotating manner.

18. The apparatus according to claim 1, further comprising a carrier on which an extraction line is arranged in a fixed gas-tight manner.

* * * * *